(12) United States Patent
Feng et al.

(10) Patent No.: US 7,396,768 B2
(45) Date of Patent: Jul. 8, 2008

(54) COPPER DAMASCENE CHEMICAL MECHANICAL POLISHING (CMP) FOR THIN FILM HEAD WRITER FABRICATION

(75) Inventors: Jian-Huei Feng, San Jose, CA (US); Hung-Chin Guthrie, Saratoga, CA (US); Ming Jiang, San Jose, CA (US); Sue Siyang Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/584,027

(22) Filed: Oct. 20, 2006

(65) Prior Publication Data

US 2008/0096389 A1    Apr. 24, 2008

(51) Int. Cl.
*H01L 21/302* (2006.01)
(52) U.S. Cl. .................. 438/692; 438/626; 438/631; 438/693
(58) Field of Classification Search .............. 438/18, 438/626, 631, 693, 692; 252/79.1, 79.2
See application file for complete search history.

(56) References Cited

U.S. PATENT DOCUMENTS

| | | | |
|---|---|---|---|
| 6,332,989 B1 | 12/2001 | Yang et al. | |
| 6,510,022 B1 | 1/2003 | Lahiri et al. | |
| 6,585,568 B2 | 7/2003 | Tsuchiya et al. | |
| 6,632,377 B1 | 10/2003 | Brusic et al. | |
| 6,804,879 B2 | 10/2004 | Hsiao et al. | |
| 6,825,117 B2 | 11/2004 | Miller et al. | |
| 6,852,631 B2 | 2/2005 | Miller | |
| 2005/0047014 A1* | 3/2005 | Bedell et al. | 360/126 |
| 2005/0153556 A1* | 7/2005 | Chopra et al. | 438/691 |
| 2005/0255693 A1* | 11/2005 | Liu et al. | 438/633 |
| 2007/0148953 A1* | 6/2007 | Itani et al. | 438/618 |

* cited by examiner

*Primary Examiner*—Lan Vinh
(74) *Attorney, Agent, or Firm*—Law Offices of Imam

(57) ABSTRACT

In one method and embodiment of the present invention, at least one coil layer is formed in a write head, using a two-slurry step of copper damascene chemical mechanical polishing method with a first slurry step removing the undesirable copper that is on top of the tantalum barrier layer and on top of the trenches and a second slurry step removing the remainder of the undesirable copper, the tantalum barrier layer, the silicon dioxide hard mask layer, the hard baked photoresist layer, the magnetic alloy such as NiFe, CoFe, or CoNiFe, and alumina insulating layer for better thin film magnetic head performances.

13 Claims, 16 Drawing Sheets

COPPER DAMASCENE CHEMICAL MECHANICAL POLISHING (CMP) FOR THIN FILM HEAD WRITER FABRICATION

BACKGROUND OF THE INVENTION

1. Field of the Invention

This invention relates generally to the field of magnetic recording heads (or write heads) having coils inducing magnetic flux for writing on a magnetic medium (such as a magnetic disc) and more particularly, to recording heads having coil sizes taller in height and turns of the coil being positioned close relative to each other, resulting from damascene manufacturing and chemical mechanical polishing (CMP) techniques, thereby causing stronger magnetic field, lower coil resistance, minimal write-induced protrusion and higher data rates.

2. Description of the Prior Art

Magnetic hard drives (or disc drives) have been in common use for storage of large groups of data for decades. Improvements in manufacturing thereof has attracted popular attention particularly to reducing the size of the drive and/or its internal components to achieve both lower costs and wider applications.

Magnetic hard drives include magnetic recording head for reading and writing of data. As well known, a magnetic recording head generally includes two portions, a write head portion or head for writing or programming magnetically-encoded information on a magnetic media or disc and a reader portion for reading or retrieving the stored information from the media.

Data is written onto a disc by a write head that includes a magnetic yoke having a coil passing there through. When current flows through the coil, a magnetic flux is induced in the yoke causing a magnetic field to fringe out at a write gap in a pole tip region. It is this magnetic field that writes data, in the form of magnetic transitions, onto the disk (or disc). Currently, such heads are thin film magnetic heads, constructed using material deposition techniques such as sputtering and electroplating, along with photolithographic techniques, and wet and dry etching techniques.

Examples of such thin film writers include a first magnetic pole, formed of a material such as NiFe which might be plated after sputter depositing an electrically conductive seed layer. Opposite the pole tip region, at a back end of the magnetic pole, a magnetic back gap can be formed. A back gap is the term generally used to describe a magnetic structure that magnetically connects first and second poles to form a completed magnetic yoke, as will be described.

One or more electrically conductive coils (or coil layers in photolithography techniques) can be formed over the first pole, between the pedestal and the back gap and can be electrically isolated from the pole and yoke by an insulation layer, which could be alumina ($Al_2O_3$) or hard baked photoresist.

With reference to FIG. 1, a plan view of an exemplary write element 302 can be seen in relation to the slider 111. A coil 304, passing through a magnetic yoke 306, induces a magnetic flux in the yoke 306. The magnetic flux in the yoke 306, in turn causes a magnetic field to fringe out at the pole tip 308. It is this fringing field 310 that writes magnetic signals onto a nearby magnetic medium.

With reference now to FIG. 2, a magnetic head 400 according to one possible embodiment of the present invention has magnetic read element 402 sandwiched between first and second magnetic shields, 404 and 406. A write head, generally referred to as 408, includes a first pole P1 410. A P1 pedestal 412 disposed in a pole tip region 413 and a first back gap layer 414, at an opposite end, are formed over the first pole. The first pole 410, P1 pedestal 412, and back gap 414 are formed of a magnetic material such as, for example NiFe. A first coil insulation layer 416 is formed over the first pole 410 between the P1 pedestal 412 and back gap layer 414. An electrically conductive coil 418, shown in partial cross section in FIG. 2, passes over the first pole 410 on top of the first insulation layer 416. A second coil insulation layer 420 insulates the turns of the coil 418 from one another and insulates the coil from the rest of the write head 408.

With continued reference to FIG. 2, a thin layer of non-magnetic write gap layer 424 is deposited over the coil 418, insulation layer 420 and P1 pedestal 412, and extends to an air bearing surface (ABS) 426 at one end and stops short of extending completely over the top of the back gap layer 414 at the other end. A magnetic second back gap material layer 428 may be formed over the top of the back gap layer 414, being magnetically connected therewith. The ABS is the surface of the magnetic head designed such that it enables the magnetic head to ride on a cushion of air between the head and the disc along the disc surface.

With continued reference to FIG. 2, a P2 pole tip 430 is provided on top of the write gap layer 424 in the pole tip region 413. The P2 pole tip 430 extends to the ABS 426, and has a width (into the page of FIG. 2) that defines a track width of the write head 408. The P2 pole tip is constructed of a magnetic material, and is preferably constructed of a soft magnetic material having a high magnetic saturation (high Bsat) and low coercivity.

With reference still to FIG. 2, a dielectric material such as alumina extends from the P2 pole tip 430 to the second back gap layer 428. The P2 pole tip 430 and the second back gap layer 428 may be formed at the same time or during the same step of processing, alternatively, they may be formed separately, as disclosed hereinabove. A second coil 434 sits atop the dielectric layer, and is insulated by an insulation layer 436, which could be for example hard baked photoresist. A P3 magnetic layer 438 is formed above the second coil 434 and the insulation layer 436 and extends from the P2 pole tip 430 to the second back gap layer 428 being magnetically connected with both. The P3 magnetic layer 438 forms the majority of a second pole of the magnetic yoke of the write head 408.

The pole tip region 426, the P3 magnetic layer 438 and the back gap 414 form the magnetic yoke (or yoke) referred to in the foregoing and below. It is desirable to maintain a short yoke length to keep the magnetic path short and thus to minimize magnetic leakage and to achieve high data rate for better performance. To do so, coil height need be increased and the coil turns placed closer together. Generally, more coil or copper results in stronger magnetic field and less resistance results in less heat generation, thus, less protrusion.

The problem with prior art write heads is that since it is desirable to keep the yoke length short, the coil (coils 418 and 434) needs to be narrow in an effort to attain an appropriate number of turns of the coil. The narrowness of the coil causes the coil resistance to be high. Therefore, the write head can become hotter during write operations thereby causing expansion and protrusion of the write head. This protrusion is likely to cause the write poles to protrude too close to the disc, potentially causing scratching of the disc.

Current damascene techniques allow for taller and closer coils. In damascene processes, trenches are formed in a first layer and a copper coil layer is formed over the trenches. Excess copper is then polished off leaving individual interconnect lines in the trenches. The removal of the excess copper is typically accomplished by chemical mechanical polishing (CMP). Although there are many known variations of the damascene method of metallization, the most common method for removing the excess copper is by CMP. CMP may also be used in removing other material during the manufacturing of coils. However, CMP generally results in overpolishing and corrosion, which is clearly undesirable in thin film heads. Therefore, the need arises for a write head of a disc drive to have a coil tall enough to have low resistance and closer turns, made with damascene and CMP techniques.

SUMMARY OF THE INVENTION

Briefly, in one method and embodiment of the present invention at least one coil layer is formed in a write head using a two-slurry step of chemical mechanical polishing method with a first slurry step removing the undesirable copper that is on top of the barrier layer and on top of the trenches and a second slurry step removing the remainder of the undesirable copper, the barrier layer, the thin hard mask layer, the hard baked photoresist layer, the magnetic alloy layer, and alumina insulating layer to obtain planar, corrosion-free, and smooth surface and accurate thickness control for good head performances.

IN THE DRAWINGS

FIGS. 5(a)-(h) show some of the relevant steps for processing or manufacturing a write head in accordance with a method and embodiment of the present invention.

FIGS. 6-12 show the effect of a CMP process according to the present invention on material removal rate, step height (planarity), and corrosion.

Figure 13:
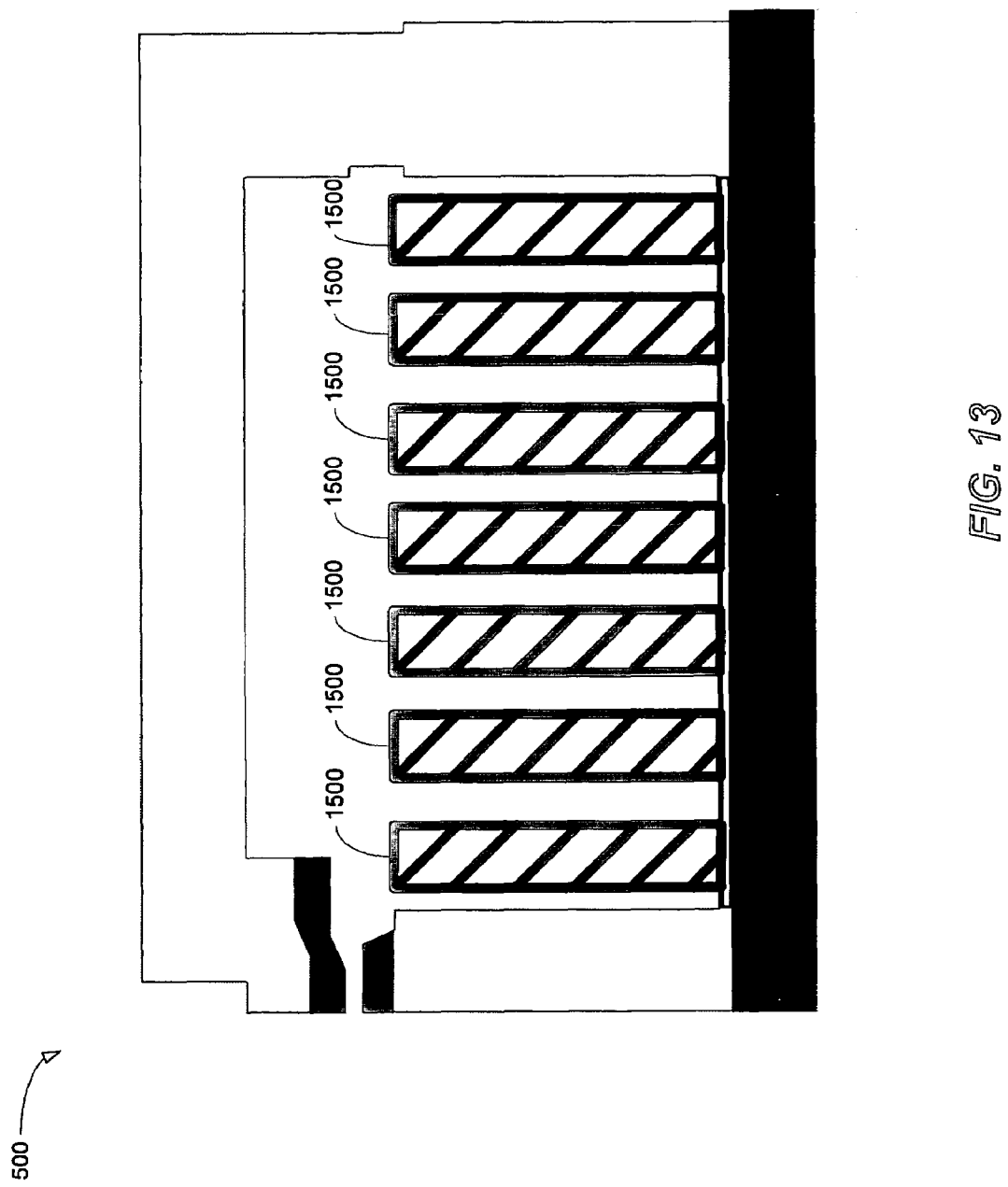
Figure 14:
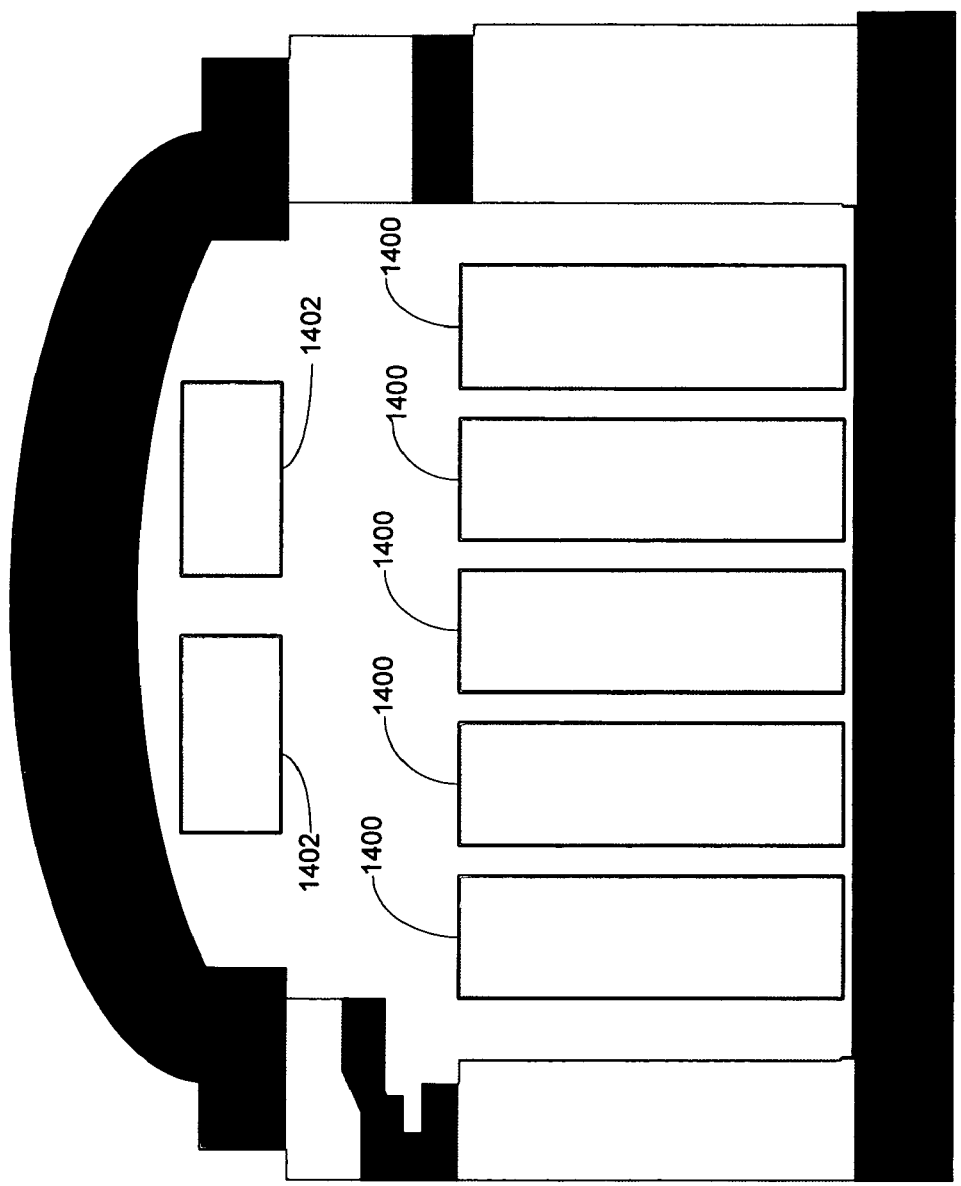

FIGS. 13-14 show a write head constructed according to an embodiment of the present invention.

DETAILED DESCRIPTION OF THE PREFERRED EMBODIMENT

A method and slurry for the chemical mechanical polishing (CMP) of copper and other material are described. In the following description numerous specific details are set forth to provide an understanding of the present invention. It will be apparent, however, to those skilled in the art and having the benefit of this disclosure, that the present invention may be practiced with apparatus and processes that vary from those specified here. The following description is the best embodiment presently contemplated for carrying out this invention. This description is made for the purpose of illustrating the general principles of this invention and is not meant to limit the inventive concepts claimed herein.

Terminology:

The terms, chip, integrated circuit, monolithic device, semiconductor device or component, microelectronic device or component, and similar terms and expressions, are often used interchangeably in this field. The present invention is applicable to all the above as they are generally understood in the field.

The terms, disc drive, disk drive, mass storage, hard disk, hard disc or hard drive, and similar terms and expressions, are often used interchangeably in this field. The present invention is applicable to all the above as they are generally understood in the field.

Substrate, as used herein, refers to the physical object that is to be planarized by means of the CMP process. A substrate may also be referred to as a wafer. Wafers, may be made of semiconducting, non-semiconducting, or combinations of semiconducting and non-semiconducting materials. AlTiC or Silicon wafers may have thin films of various materials formed upon them. These thin films may be planarized with CMP processing.

Overview:

During manufacturing of a write head and in particular, coils therein, in accordance with a method of the present invention, CMP is performed in a two-step slurry process, in the first slurry step, to remove only copper, by CMP, and in the second slurry step to remove remaining copper but largely to remove Tantalum (Ta), silicon dioxide ($SiO_2$) hard mask, baked photoresist, nickel iron (NiFe) and alumina ($Al_2O_3$), by CMP to obtain planar and corrosion-free surface and accurate thickness control for better thin film head performances.

In the first slurry step of one of the methods of the present invention, Ta acts as a stop and barrier layer. In the second slurry step, slightly additional copper is removed in addition to other material, such as alumina, hard mask, photoresist, and magnetic alloy.

Figure 3:
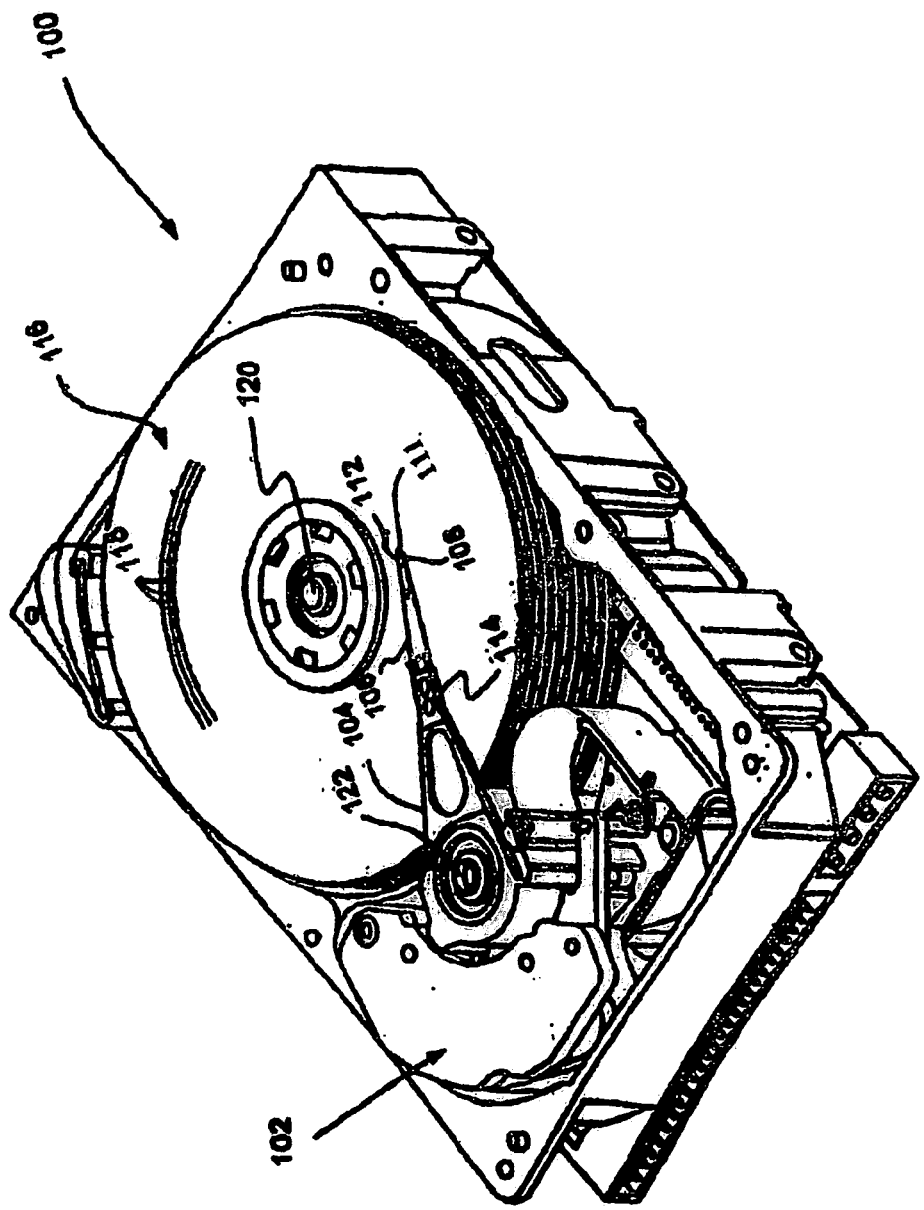
FIG. 3 shows a top perspective view of a disc drive 100 embodying this invention is shown in accordance with an embodiment of the present invention.

Referring now to FIG. 3, a top perspective view of a disc drive 100 embodying this invention is shown in accordance with an embodiment of the present invention. The disc drive 100 is shown to include a voice coil motor (VCM) 102, an actuator arm 104, a suspension 106, a flexure 108, a slider 111, a read-write head 112, a head mounting block 114, and magnetic disc or media 116. Suspension 106 is connected to the actuator arm 104 at the head mounting block 114. The actuator arm 104 is coupled to the VCM 102. The disc 116 includes a plurality of tracks 118 and rotates about axis 120. The tracks 118 are circular, each extending circularly around the surface of the disc 116 for storing magnetically-encoded data or information using the head 112, which will be discussed in greater detail with respect to further figures. It should be noted that while application of the various apparatus and methods of the present invention are discussed relative to longitudinal disc drives herein, application is readily made to perpendicular disc drives.

During operation of the disc drive 100, rotation of the disc 116 generates air movement which is encountered by the slider 111. This air movement acts to keep the slider 111 afloat a small distance above the surface of the disc 116, allowing the slider 111 to fly above the surface of the disc 116. The VCM 102 is selectively operated to move the actuator arm 104 around the axis 120, thereby moving the suspension 106 and positioning the transducing head (not shown), which includes a main pole (not shown), by the slider 111 over the tracks 118 of the disc 116. It is imperative to position the transducing head properly to read and write data from and to the concentric tracks 118.

Figure 4:
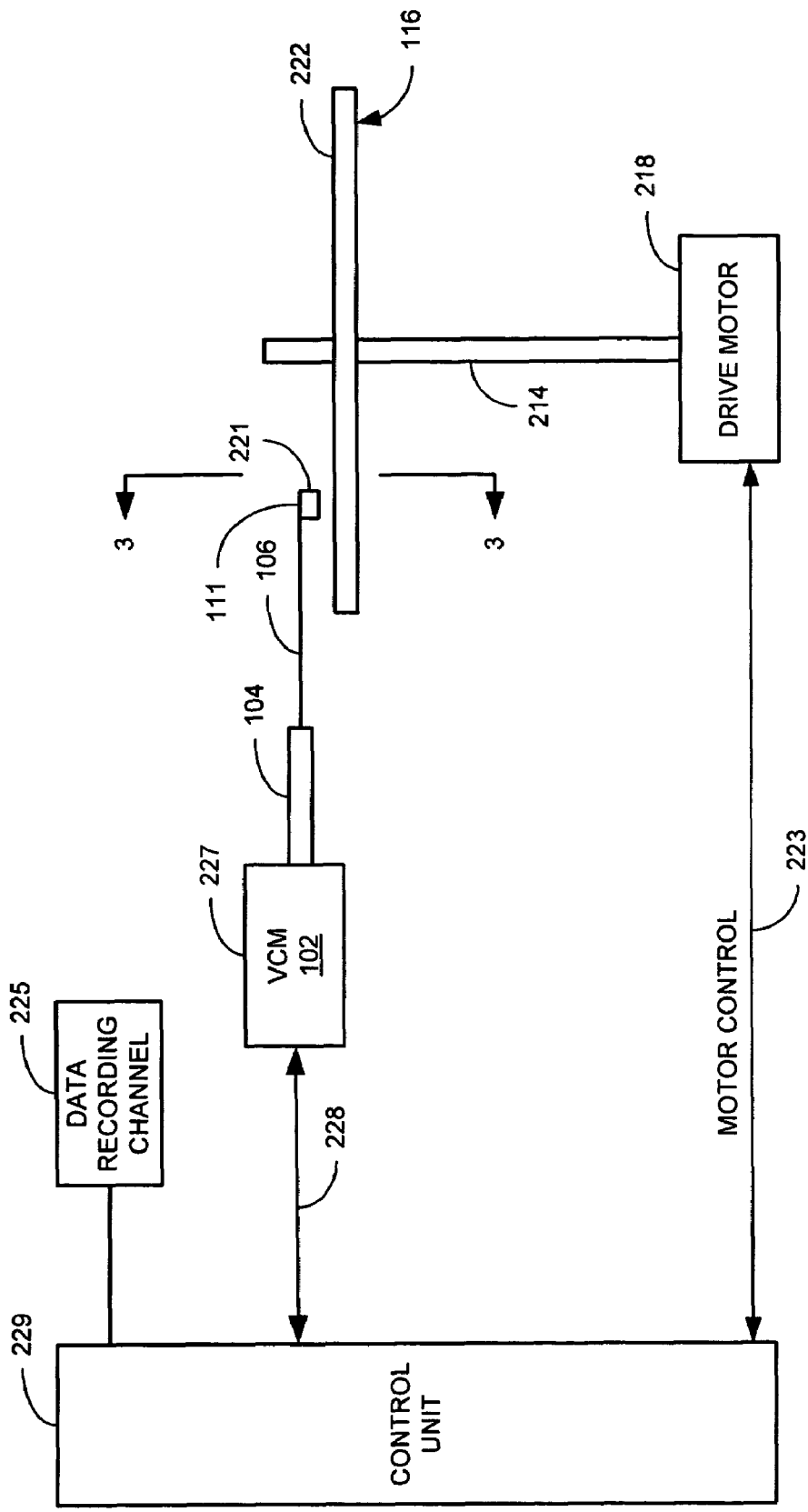
FIG. 4 shows further structures of the disc drive 100 in accordance with an embodiment of the present invention.

With reference now to FIG. 4, further structures of the disc drive 100 are shown in accordance with an embodiment of the present invention. As shown in FIG. 4, at least one rotatable magnetic disc 116 is supported on a spindle 214 and rotated by a disc drive motor 218. The magnetic recording on each disc is in the form of an annular pattern of concentric data tracks (not shown in FIG. 4) on the disc 116.

Figure 1:
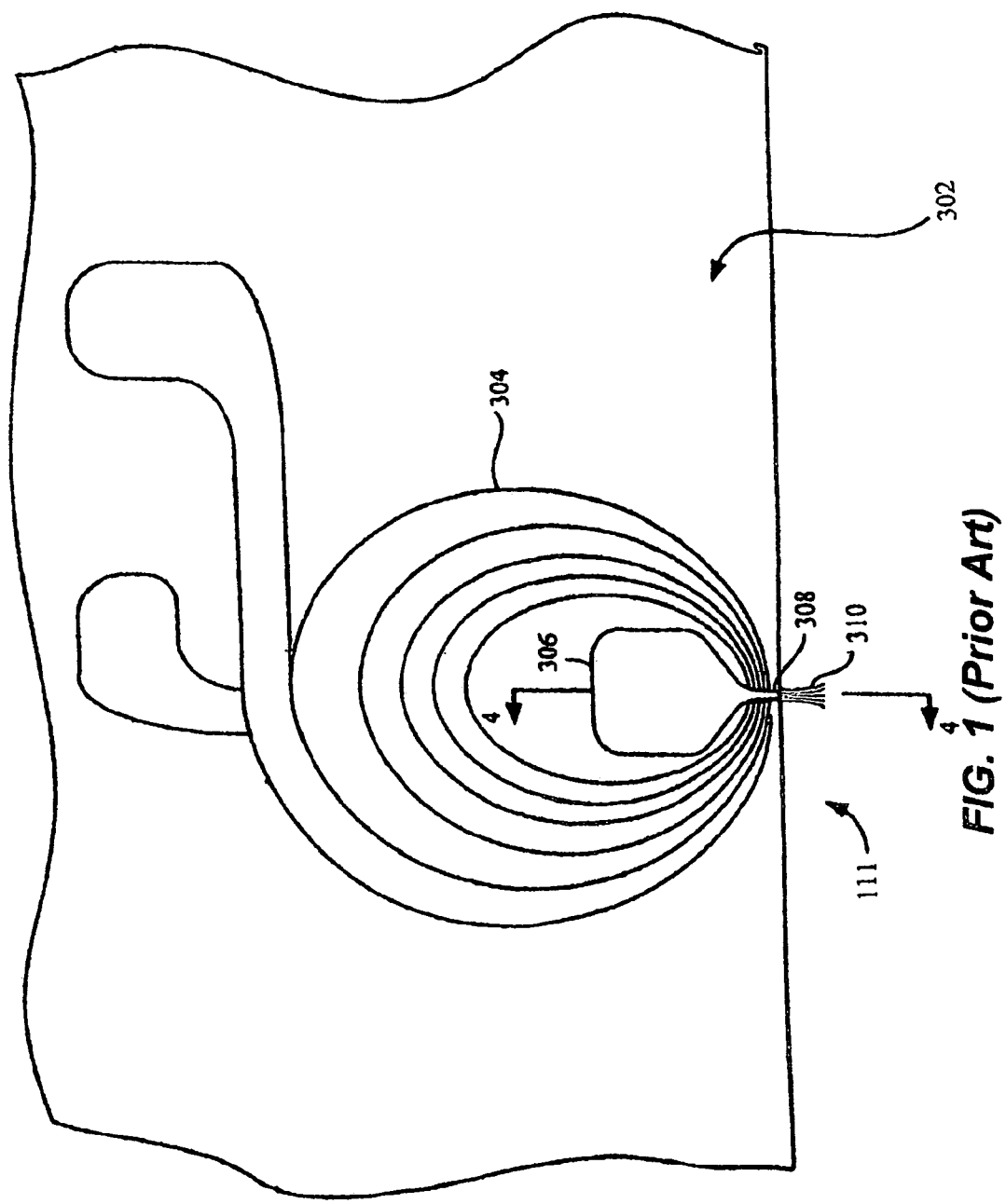
FIG. 1 illustrates a plan view of an exemplary prior art write element 302 that can be seen in relation to the slider 111.
Figure 2:
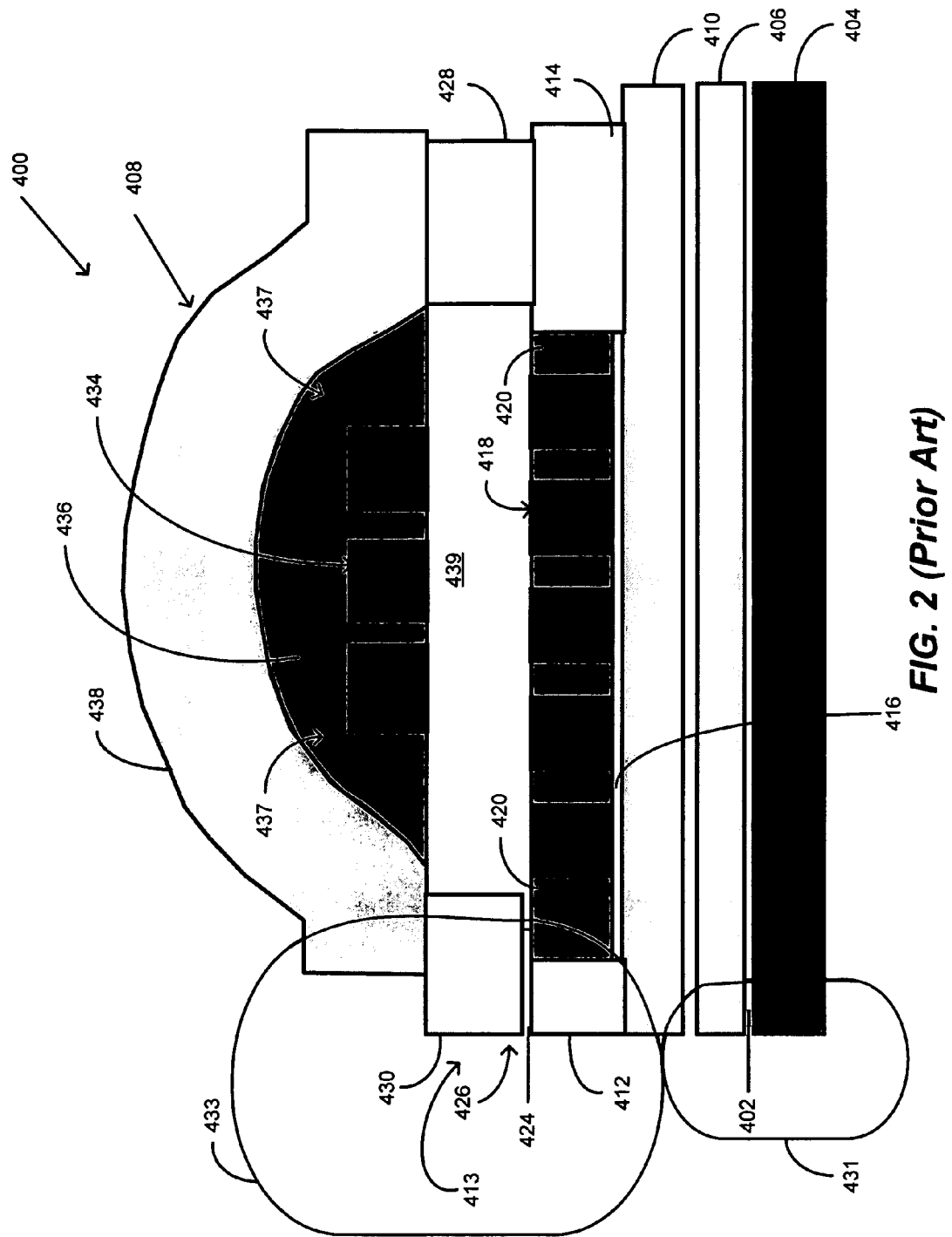
FIG. 2 shows a prior art magnetic head 400.

At least one slider 111 is positioned near the magnetic disc 116, each slider 111 supporting one or more magnetic head assemblies 221. As the magnetic disc rotates, the slider 111 is moved radically in and out over the disc surface 222 so that the magnetic head assembly 221 may access different tracks of the magnetic disc where desired data are written. Each slider 111 is attached to the actuator arm 104 by way of a suspension 106. The suspension 106 provides a slight spring force which biases slider 111 against the disc surface 222. Each actuator arm 104 is attached to an actuator means 227. The actuator means 227, as shown in FIG. 2, may be the VCM 102. The VCM 102 comprises a coil movable within a fixed magnetic field, the direction and speed of the coil movements being controlled by the motor current signals supplied by the controller 229.

During operation of the disc storage system or disc drive 100, the rotation of the disc 116 generates an air bearing between the slider 111 and the disc surface 222 which exerts an upward force or lift on the slider. The air bearing thus counter-balances the slight spring force of the suspension 106 and supports the slider 111 off and slightly above the disc surface by a small, substantially constant spacing during normal operation.

The various components of the disc storage system are controlled in operation by control signals generated by the control unit 229, such as access control signals and internal clock signals. Typically, the control unit 229 comprises logic control circuits, storage means and a microprocessor. The control unit 229 generates control signals to control various system operations such as drive motor control signals on line 223 and head position and seek control signals on line 228. The control signals on line 228 provide the desired current profiles to optimally move and position slider 111 to the desired data track on the disc 116. Write and read signals are communicated to and from write and read heads 221 by way of recording channel 225.

The above description of a typical magnetic disk storage system, and the accompanying illustration of FIG. 4 are for representation purposes only. It should be apparent that disc storage systems may contain a large number of discs and actuators, and each actuator may support a number of sliders. It should be noted that the term "disc", as used herein, is the same as the term "disk", as known to those of ordinary skill in the art, in fact, the terms "disc" and "disk" are used interchangeably herein.

In write heads of disc drives, generally, an electrically conductive coil layer is plated over a first pole on top of a first barrier/seed insulation layer in the coil pockets. The coil material may be deposited in the coil pockets by plating or other deposition techniques. The coil turns induce a magnetic flux in the yoke which is used to generate the write filed used to record magnetic transitions on the media. The number of coil turns is dependent on the specifics of the design of the head. The greater the number of turns, the greater the generated flux but also greater inductance and resistance (since each coil turn has to be narrower). One solution to this problem is presented in the U.S. patent application Ser. No. 10/652,878, filed on Aug. 29, 2003, entitled "Method For Patterning A Self-Aligned Coil Using A Damascene Process", the disclosure of which is incorporated herein by reference, as though set forth in full. U.S. Pat. No. 6,804,879 B2, issued on Oct. 19, 2004 to Hsiao et al. and entitled "Method of Fabricating a Magnetic Transducer With a Write Head Having a Multi-layer Coil" discloses a method for making a magnetic transducer with an inductive write head having a multilayer coil with a high aspect ration and a short yoke using damascene techniques. While the damascene techniques of the latter two disclosures provide for higher aspect ratios and taller coil size, the two-step CMP slurry and methods of the present invention provide process and technology to build further close coil turns and taller coil size effectuating less protrusion and higher data rates.

Figure 5A:
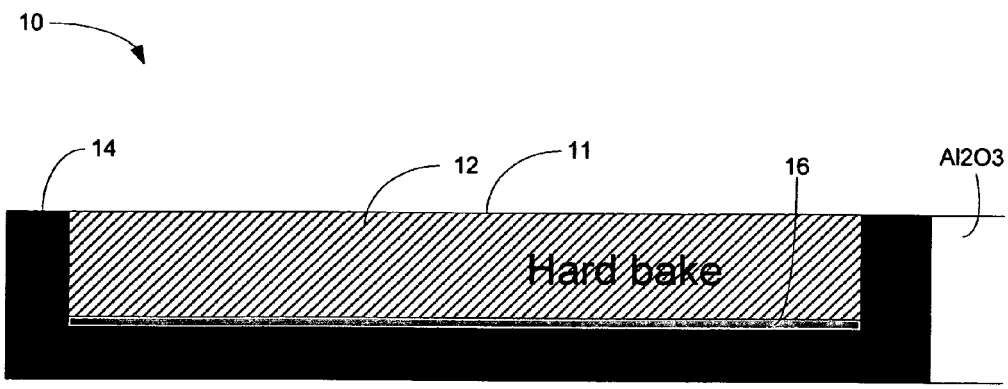

FIGS. 5(a)-(h) show some of the relevant steps for processing or manufacturing a write head to increase the height of the coil therein. In FIG. 5(a), at step 10, a magnetic alloy layer 14 is deposited onto alumina (not shown) and thereon an insulating layer 16 is formed on top of which a polymeric insulating material 12 (preferably hard bake photoresist) is formed to serve later as a bed for a first coil layer. Some examples of the magnetic alloy layer 14 are NiFe, CoFe, and CoNiFe and refill insulating material is alumina and then CMP.

Figure 5B:
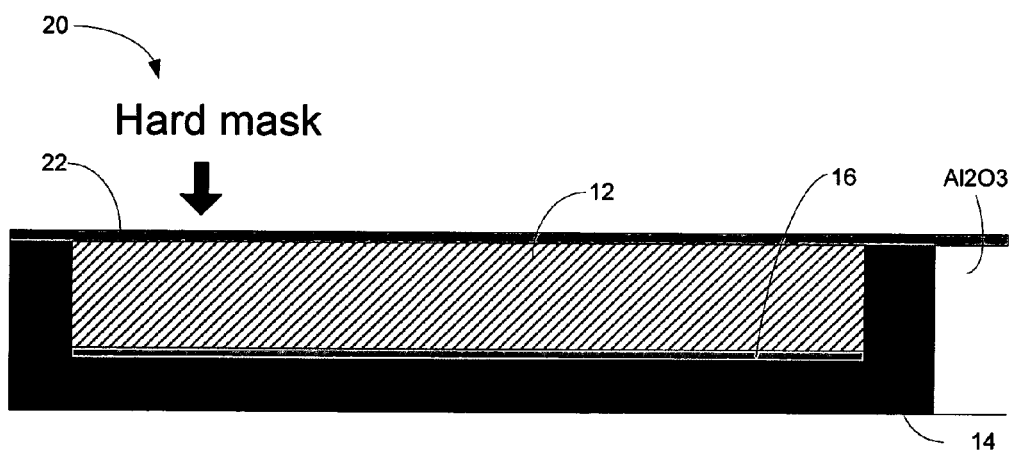
Figure 5C:
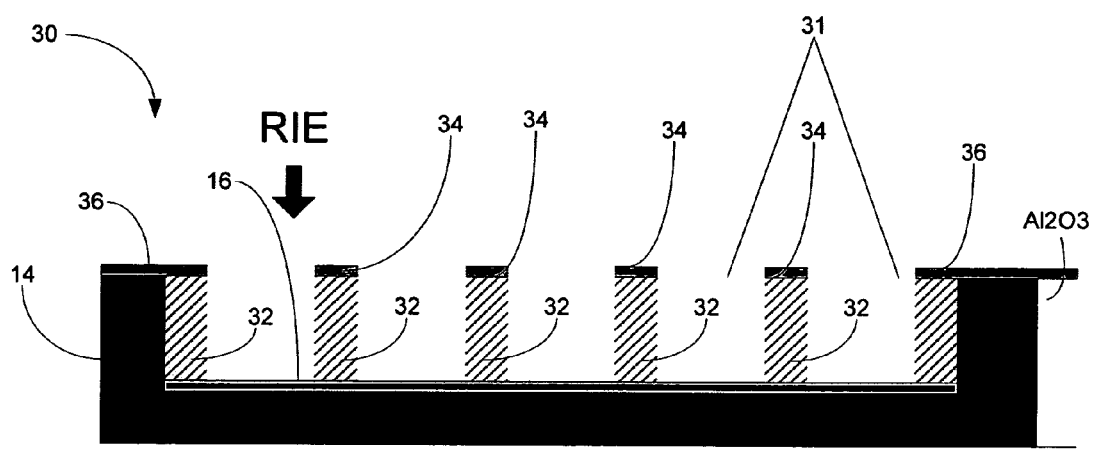

At step 20, in FIG. 5(b), a dielectric hard mask 22 is formed on top of the layer 11. In one embodiment, the hard mask is made of, for example, $SiO_2$ although other suited hard mask material may be employed. FIG. 5(c) shows the trenches 31 which have been etched through the plurality of layer stacks 34. Each layer stack 34 includes a dielectric hard mask 22, as formed in step 20 and a masked photoresist layer 32, remaining from the material 12, which is used to define the coil turns. An etching process is then performed at step 30 by a method, such as reactive ion etching (RIE), to remove the material from the trenches 31 defined for the subsequent metallic structures. That is, undesirable material is removed, by RIE, from the sidewalls and bottom of the trenches.

Figure 5D:
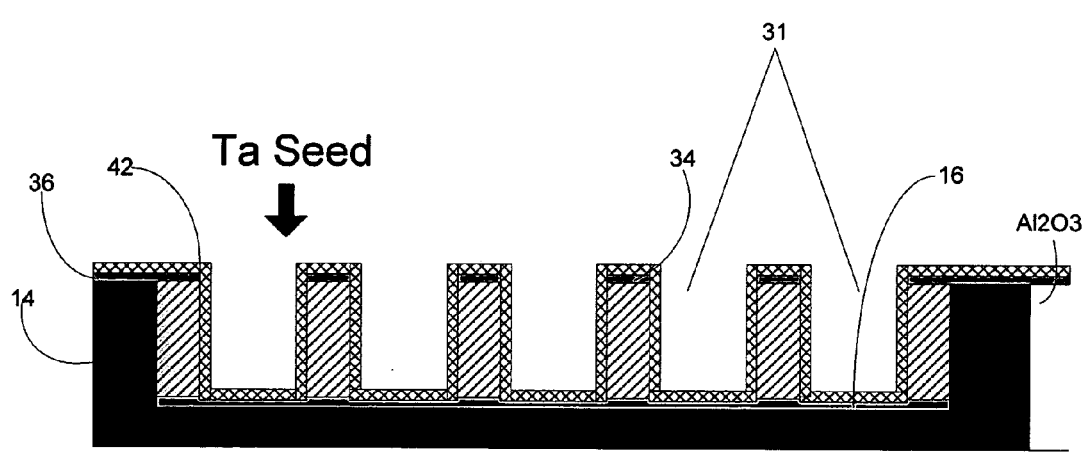

In FIG. 5(d), a first seed layer 42 is deposited on top of the stacks 34 as well as the bottom and sidewalls of the trenches 31. The seed layer 42 serves as an adhesion layer and barrier layer to diffuse copper, which is deposited in the next steps. In one example, Ta makes up the seed layer 42, however, other suitable material, such as tantalum nitride (TaN), titanium nitride (TiN), or Ti may be employed.

Figure 5E:
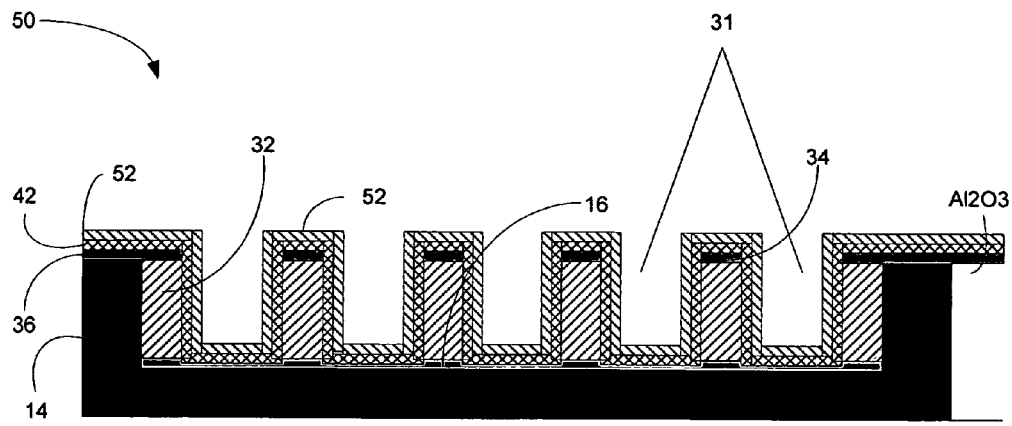

In the next step 50, in FIG. 5(e), a second seed layer 52 is deposited on top of the seed layer 42 and in one example, is made of a conductive material, such as copper, due to the electroplating step to follow. It should be noted that the thickness of the first and second seed layers, 42 and 52, respectively, has been greatly exaggerated in relation to the other films/layers. As is readily known, seed layers are generally much thinner than the other layers and if drawn to scale would not be visible.

Figure 5F:
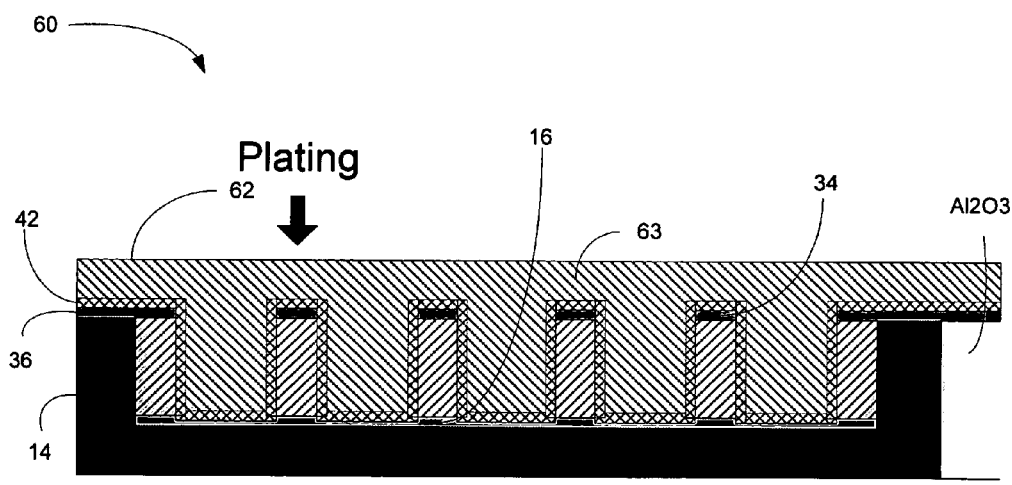

In FIG. 5(f), the result of wet thin film electroplating the copper 63 for the coil is shown. This deposition process allows a nonconformal film to be formed overfilling the trenches with copper 62. At this point, CMP is used to planarize the surface down to the level of the pedestals of the layer 32, however, in contrast to prior art techniques, CMP is performed as a two step slurry process, as demonstrated and discussed relative to the following two figures.

Figure 5G:
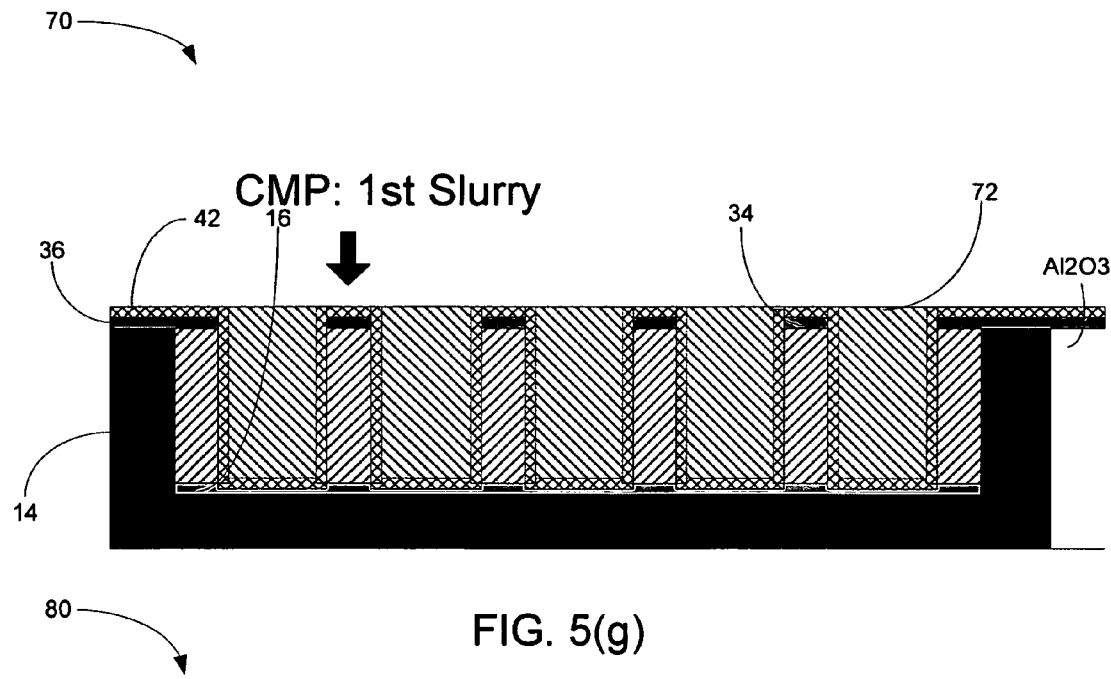
Figure 5H:
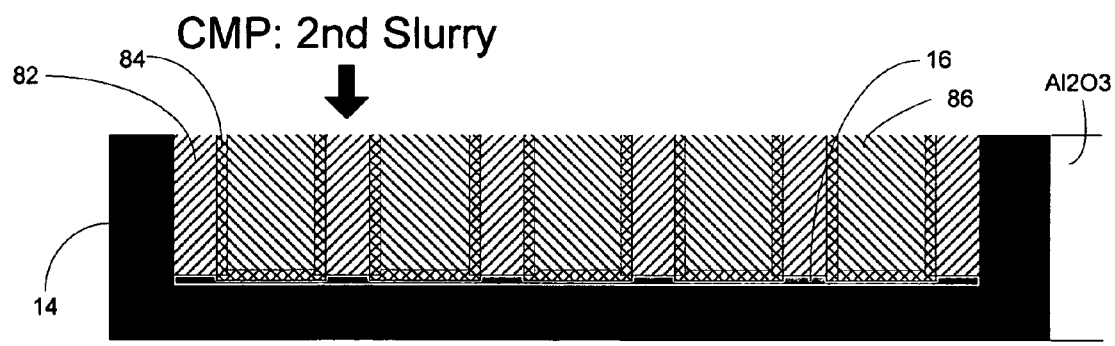

In FIG. 5(g), a first slurry step 70 is performed to remove the undesirable copper 62, by a CMP process with high selectivity of copper to Ta and $SiO_2$ and to stop at the first layer or stack 34. That is, the surface of the latter is planarized in this step. A combination of a particular pH, oxidizer and corrosion inhibitor is employed in the step 70. The oxidizer concentration essentially defines the copper removal rate and is essential in reaching a planar surface and avoiding corrosion while the corrosion inhibitor, such as a 90% dominant organic substance serves to passivate copper. One such corrosion inhibitor is bencotriazole (BTA), known to be best for strongly passivating copper. An example of an oxidizer is a hydrogen peroxide ($H_2O_2$) concentration. Thus, one example composition used in the first slurry step is $Al_2O_3/BTA/H_2O_2$. An example of the amount of concentrations is as follows:

Al$_2$O$_3$/BTA/H$_2$O$_2$ Slurry: Al$_2$O$_3$ 150 nm, 3%+Benzotriazole (BTA) 0.002%+H$_2$O$_2$ 10%+DI water with a pH of 4.

Although BTA maybe from 0.0002% to 0.2%, H$_2$O$_2$ may be from 1% to 20%, Al2O3 may be from 1% to 10% and the pH may be from 2 to 6. The particle size of Al$_2$O$_3$ may be from 50 nanometers (nm) to 250 nm. It is believed that the first slurry or step 70 takes 120 seconds for removing 2.5 micrometers (um) of copper at a rate of 20 nm/sec MRR and a polishing speed of 90/70 revolutions per minute (rpm) with a pH of 4 to tune the high selectivity of copper to Ta/SiO$_2$.

In FIG. 5(*h*), a second slurry step 80 is performed to remove the remainder of the copper 62 and the first seed layer 42 or that which was not removed by step 70, the barrier layer 52, hard mask 22, photoresist layer 32, the magnetic alloy layer 14 and the layer 16 by a CMP process using a chemical composition, as will be described in further detail shortly. That is, the surface of the pedestals and copper is planarized further, with greater resolution, in this step.

A combination of a particular pH, oxidizer and corrosion inhibitor is employed in the step 80. The oxidizer concentration is essential in removing copper and the aforementioned material at an acceptable rate and is essential in reaching a planar surface and avoiding corrosion. One such corrosion inhibitor is bencotriazole (BTA), known to be best for strongly passivating copper. An example of an oxidizer is ammonium persulfate (APS). One example composition used in the second slurry step is SiO$_2$/BTA/APS. An example of the amount of concentrations is as follows:

SiO$_2$/BTA/APS Slurry: SiO$_2$ 150 nm, 10%+Benzotriazole (BTA) 0.002%+Ammonium Persulfate (APS) 0.2%+DI water–pH 9.5 (KOH).

Although BTA may be from 0.0002% to 0.2%, APS may be from 0.02% to 2%, SiO$_2$ may be from 1% to 30%. The thickness of SiO$_2$ may be from 50 nm-250 nm and the pH may be from 8 to 12.

In the step 80, the polishing removal rate of copper, the magnetic alloy layer, the insulating layer as well as the first seed layer and the hard mask can be optionally controlled by adjusting the SiO2+APS+BTA to polish six materials at the same time, i.e. Cu, Ta, SiO2, photoresist, NiFe and alumina to reach planar surface in damascene coil structure. Finally, at step 80, a first coil layer having a plurality of turns, made of copper, is formed.

Figure 6:
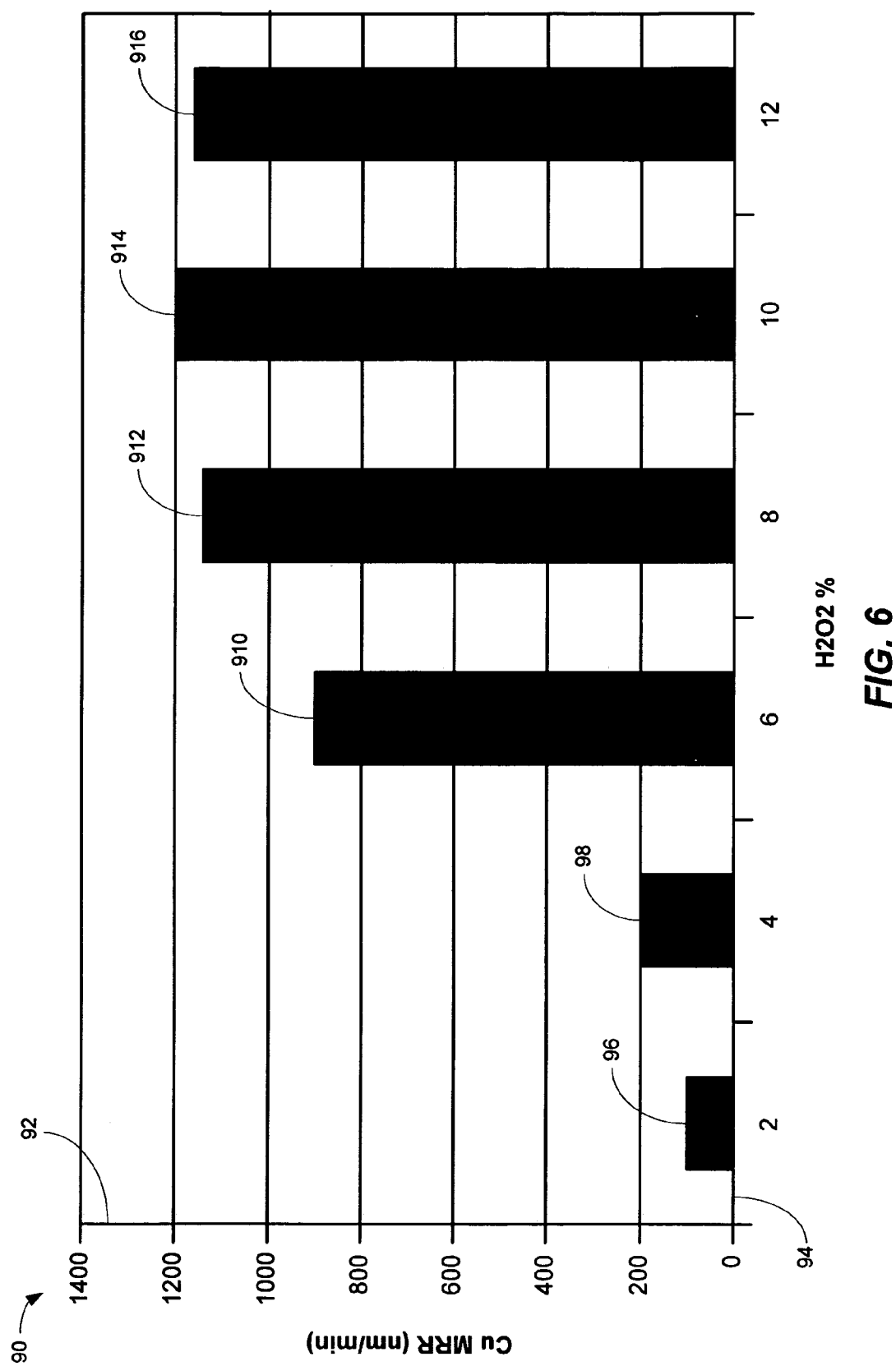
Figure 7:
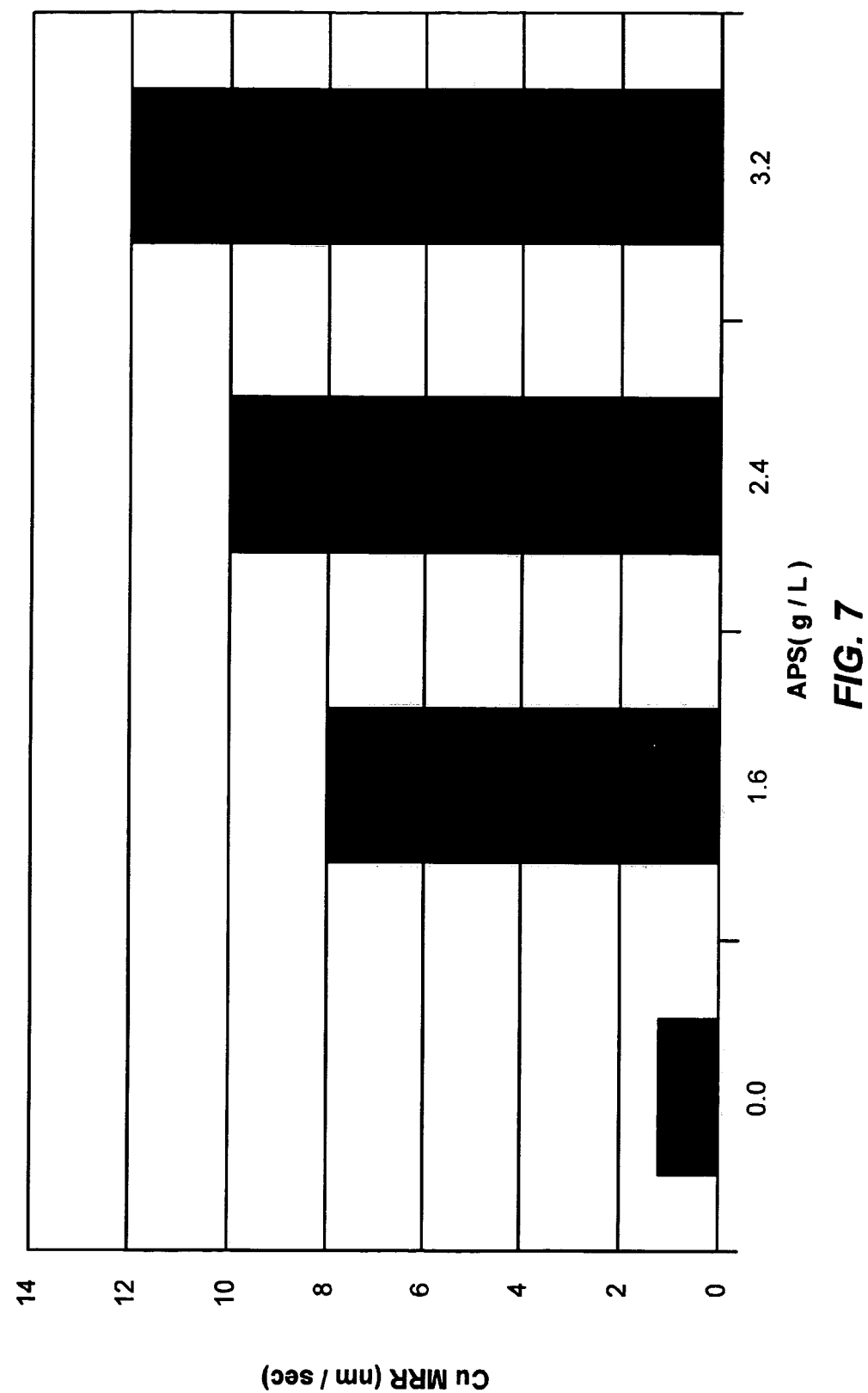

FIG. 6 shows a graph of the performance of the step 70 as to the copper material removal rate (MRR, nm/min), shown in the y-axis, vs. the percentage or concentration of hydrogen peroxide (H$_2$O$_2$), shown in the x-axis. FIG. 7 shows a graph of the performance of the step 80 as to the copper MRR (in nm/sec), shown in the y-axis, vs. the concentration of APS in gramsaiter, shown in the x-axis.

Figure 8:
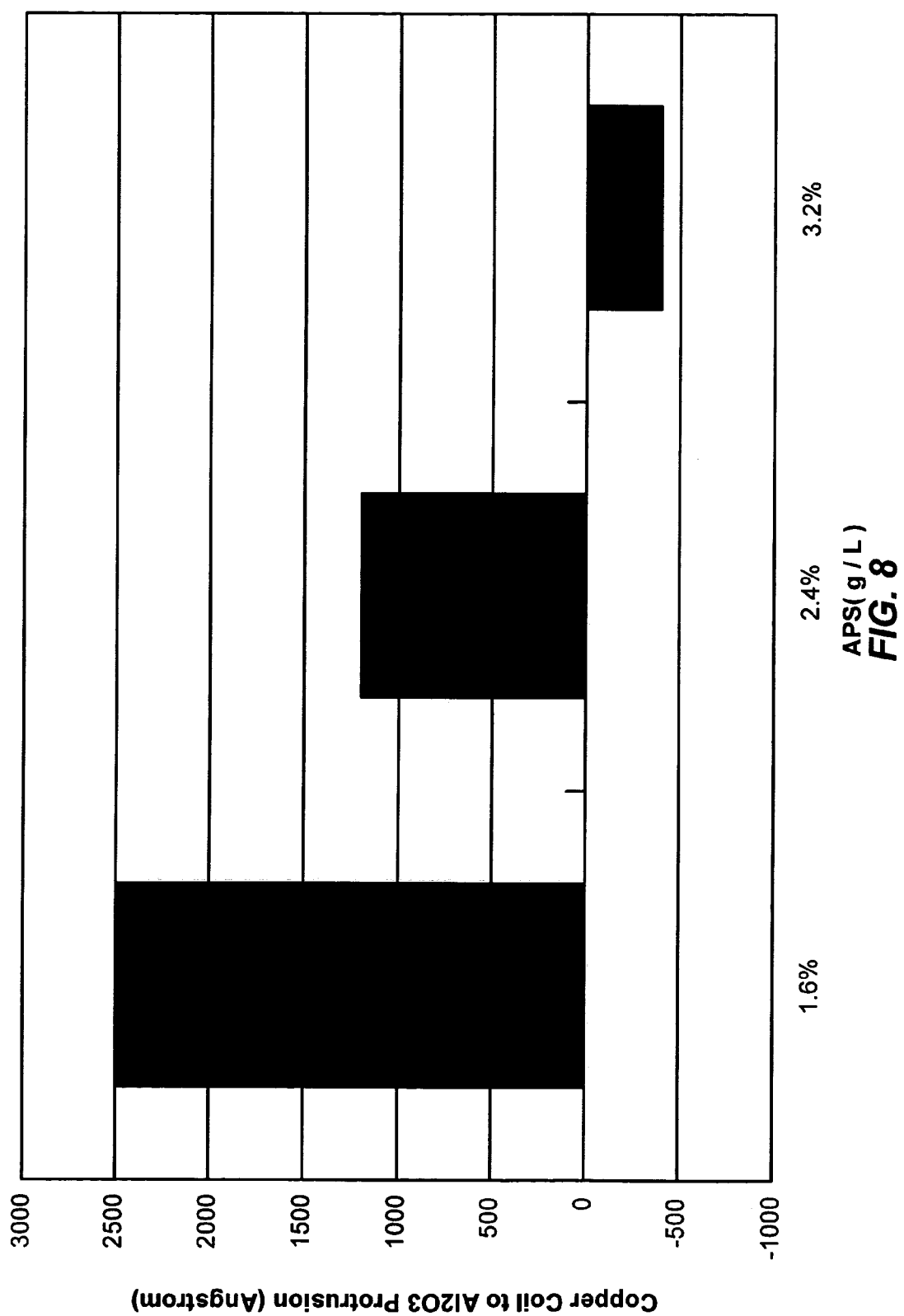

FIG. 8 is a graph showing the step height of copper coil to Al$_2$O$_3$ (in Angstrom), shown in the y-axis, vs. APS concentration in grams/liter, shown in the x-axis. APS is important for copper removal, as earlier noted. One example composition of APS is (NH$_4$)$_2$S$_2$O$_8$) is key for copper removal. (2NH$^{4+}$) from APS is a complexing agent for copper removal rate control. It has been experienced that alumina (or insulating layer) is removed much faster than the copper when polishing without APS in slurry. Also, when the oxidant (APS) concentration was increased, the alumina removal rate was unchanged but copper removal rate was proportional to the (NH4+) ammonia concentration from APS. Therefore, the MRR of Cu is controllable as is the step height of copper coil to Al$_2$O$_3$.

Figure 9:
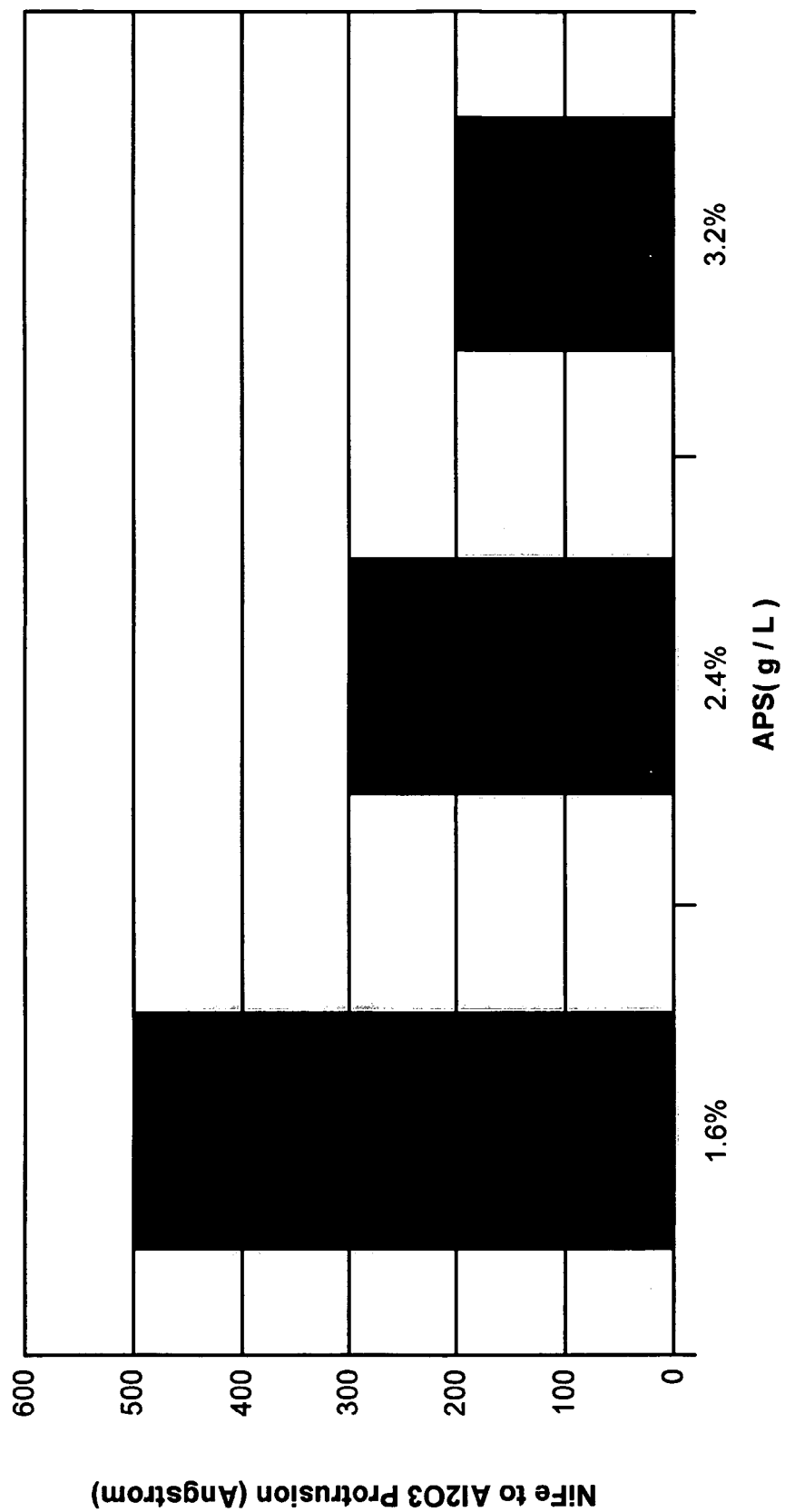

FIG. 9 is a graph showing the step height of magnetic alloy layer (NiFe) to insulating layer (or Al$_2$O$_3$) (in Angstrom), shown in the y-axis, vs. APS concentration in grams/liter, shown in the x-axis. APS is the key for the magnetic alloy layer or NiFe removal. An example composition of the APS, in step 80, is (NH$_4$)$_2$S$_2$O). S$_2$O$_8^{2-}$ from APS is an oxidizer for controlling NiFe removal rate. It has been experienced that the alumina or insulating layer is removed much faster than the removal of the magnetic alloy layer or NiFe when no APS is used. When the oxidant (APS) concentration is increased, the alumina removal rate remained unchanged but the NiFe removal rate reached a peak and then declined at higher concentration. Therefore, the MRR of NiFe can be controlled and the step height of NiFe to Al2O3 can also be controlled.

Figure 10:
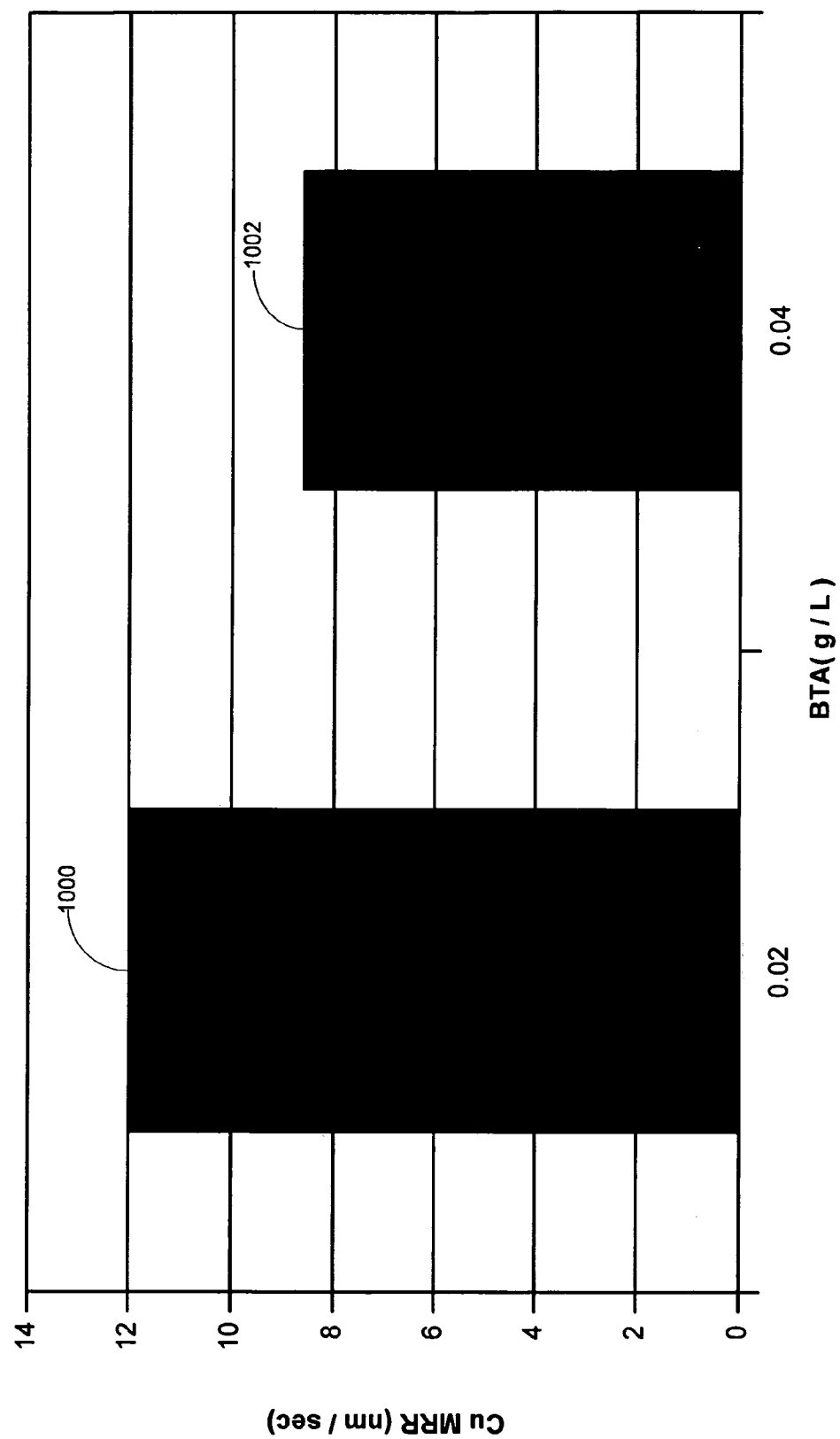
Figure 11:
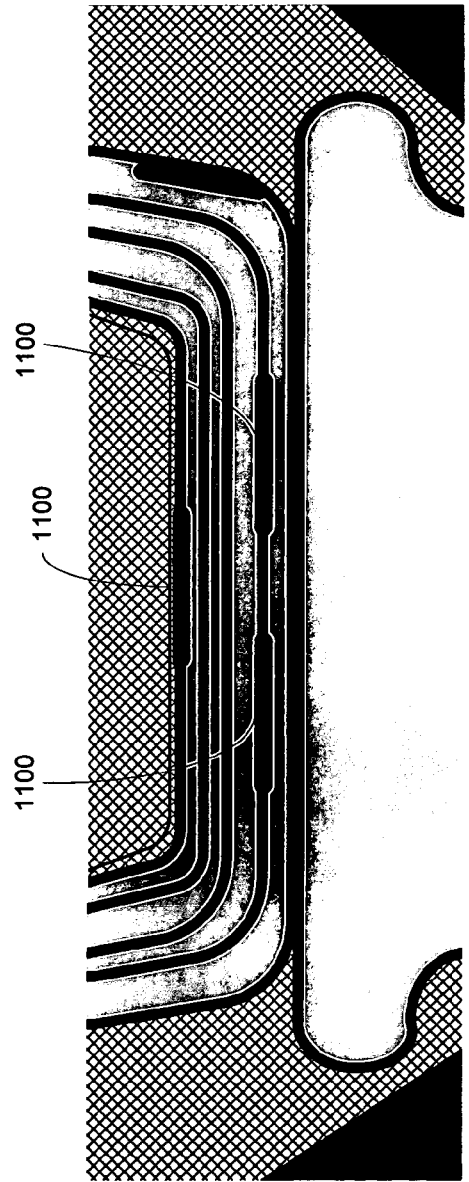
Figure 12:
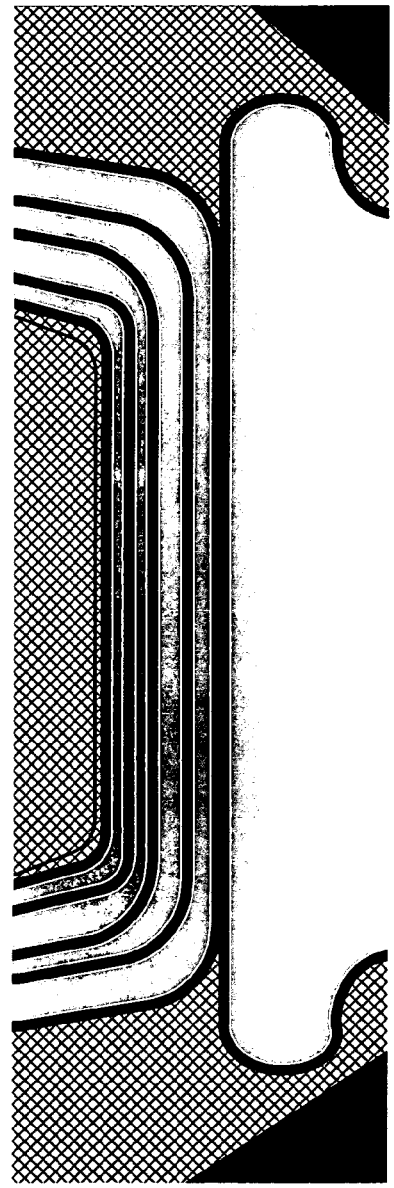

FIG. 10 is another graph showing the copper material removal rate (MRR, nm/sec), in the y-axis, relative to the BTA concentration (in grams/liter) in the x-axis. This graph is intended to emphasize the difference in the amount of chemical etching of copper at step 80, the second slurry step, when using low BTA concentration, at 1000, and when using higher BTA concentration, at 1002. The result is better illustrated in FIGS. 11 and 12, respectively. In FIG. 11, corrosion is exhibited at 1100 in not enough of BTA while no corrosion effect is visibly exhibited in enough of BTA in FIG. 12. FIGS. 11 and 12 show partial views of one layer of copper coil.

FIG. 13 shows a write head 500 having one layer of coil 1500 made in accordance with the methods of the present invention. The write head 500 is essentially the same as a prior art write heads except that the coil 1500 is taller in size with a larger aspect ratio and closer coil turns to achieve higher data rates and less protrusion. As discussed hereinabove, this invention provides an improved structure and method of fabrication of the write head. With reference to FIG. 13, a plan view of a portion of an exemplary slider 111 including the write head 500 is shown in accordance with one possible embodiment of the present invention. To provide perspective, the write head portion 500 of FIG. 13 is a part of the slider 111 of FIG. 4, operational in a disk drive, such as the disc drive 100.

FIG. 14 shows a another write head 550 having a two layer coil structure and made in accordance with the methods of the present invention. With reference to FIG. 14, a plan view of a portion of an exemplary slider 111 including the write head 550 is shown in accordance with another possible embodiment of the present invention. To provide perspective, the write head portion 550 of FIG. 14 is a part of the slider 111 of FIG. 4, operational in a disk drive, such as the disc drive 100. The write head 550 includes a first layer of coils 1400 and a second layer of coils 1402 and is essentially the same as the prior art write head of FIG. 2, except that the first and second coil layers are taller in size with a larger aspect ratio and closer coil turns to achieve higher data rates and less protrusion.

It should be noted that the figures referred to herein are not drawn to scale.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of forming at least one coil layer in a write head comprising:

depositing a first insulating layer on top of a magnetic alloy layer;

forming hard baked photoresist on top of the deposited first insulating layer;

filling a second insulating layer on top of the hard baked photoresist;

polishing back the filled second insulating layer;

depositing a dielectric hard mask on top of the formed hard baked photoresist layer;

etching trenches through a plurality of layer stacks, each made of the dielectric hard mask and the hard bake photoresist defining coil turns;

depositing a barrier layer on top plurality of layer stacks and the bottom and sidewalls of the trenches;

depositing a copper seed layer on top of the barrier layer;

electroplating the trenches with copper wherein some of the electroplated copper forms a first coil layer and the remainder of the filled copper is undesirable;

performing a two-slurry step of chemical mechanical polishing with a first slurry step removing the undesirable copper that is on top of the barrier layer and on top of the trenches, using a composition of $Al_2O_3/BTA/H_2O_2$ Slurry having a concentration of $Al_2O_3$ 150 nm, 3%+Benzotriazole (BTA) 0.0002% to 0.2%+$H_2O_2$ 1% to 20%, +DI water with a pH of 2 to 6, and a second slurry step removing the remainder of the undesirable copper, the barrier layer, the copper seed layer, the hard mask, the hard basked photoresist layer, the magnetic alloy layer, and the second insulating layer.

2. A method of forming at least one coil layer as recited in claim 1 wherein the magnetic alloy is made of a group consisting of: NiFe, CoFe, and CoNiFe.

3. A method of forming at least one coil layer as recited in claim 1 wherein the first and second insulating layers are each made of hard baked photoresist and $Al_2O_3$.

4. A method of forming at least one coil layer as recited in claim 1 wherein the hard mask is made of silicon dioxide. ($SiO_2$).

5. A method of forming at least one coil layer as recited in claim 1 further including the step of etching to remove undesirable material from the trenches by reactive ion etching.

6. A method of forming at least one coil layer as recited in claim 1 wherein the seed layer is made of copper.

7. A method of forming at least one coil layer as recited in claim 1 wherein, during the first slurry step, obtaining high selectivity of copper to the material of the first and second seed layers and to use the first seed layer as a stop layer.

8. A method of forming at least one coil layer as recited in claim 1 wherein the barrier layer is made of a group consisting of: Ta, TaN, TiN, and Ti.

9. A method of forming at least one coil layer as recited in claim 8 wherein, during the first slurry step, using an oxidizer and a corrosion inhibitor.

10. A method of forming at least one coil layer as recited in claim 9 wherein the corrosion inhibitor comprises bencotriazole (BTA) and the oxidizer is a hydrogen peroxide ($H_2O_2$).

11. A method of forming at least one coil layer as recited in claim 10 wherein the BTA has a pH associated therewith and the pH is between 2 to 6.

12. A method of forming at least one coil layer in a write head comprising:
depositing a first insulating layer on top of a magnetic alloy layer;
forming hard baked photoresist on top of the deposited first insulating layer;
filling a second insulating layer on top of the hard baked photoresist;
polishing back the filled second insulating layer;
depositing a dielectric hard mask on top of the formed hard baked photoresist layer;
etching trenches through a plurality of layer stacks, each made of the dielectric hard mask and the hard bake photoresist defining coil turns;
depositing a barrier layer on top plurality of layer stacks and the bottom and sidewalls of the trenches;
depositing a copper seed layer on top of the barrier layer;
electroplating the trenches with copper wherein some of the electroplated copper forms a first coil layer and the remainder of the filled copper is undesirable;
performing a two-slurry step of chemical mechanical polishing with a first slurry step removing the undesirable copper that is on top of the barrier layer and on top of the trenches and a second slurry step removing the remainder of the undesirable copper, the barrier layer, the copper seed layer, the hard mask, the hard basked photoresist layer, the magnetic alloy layer, and the second insulating layer using a combination of a particular pH, oxidizer and corrosion inhibitor, wherein the corrosion inhibitor is bencotriazole (BTA) and the oxidizer is ammonium persulfate (APS) and further wherein the combination is $SiO_2$/BTA/APS and the concentrations of the combination is:
$SiO_2$/BTA/APS Slurry: $SiO_2$ 150 nm, 10%+Benzotriazole (BTA) 0.0002% to 0.2%+Ammonium Persulfate (APS) 0.02% to 2%+DI water-pH 8 to 12 (KOH).

13. A method of forming at least one coil layer in a write head of a disc drive comprising:
depositing a first insulating layer on top of a magnetic alloy layer;
forming hard baked photoresist on top of the deposited first insulating layer;
filling a second insulating layer on top of the hard baked photoresist and polishing back;
depositing a dielectric hard mask on top of the hard baked photoresist layer;
etching trenches through a plurality of layer stacks, each made of the dielectric hard mask and the hard bake photoresist defining coil turns;
depositing a barrier layer is on top plurality of layer stacks and the bottom and sidewalls of the trenches;
depositing a copper seed layer on top of the barrier layer;
electroplating the trenches with copper wherein some of the electroplated copper forms a first coil layer and the remainder of the filled copper is undesirable;
performing a two-slurry step of chemical mechanical polishing with a first slurry step removing the undesirable copper that is on top of the barrier layer and on top of the trenches using a composition of AbOQ~/BTA/H202 Slurry having a concentration of 19 A1203 150 nm, 3%+Benzotriazole (BTA) 0.0002% to 0.2%+H202 1% to 20%, +DI water with a pH of 2 to 6 and a second slurry step removing the remainder of the undesirable copper, the barrier layer, the seed layer, the hard mask, the hard baked photoresist layer the magnetic alloy layer, and alumina insulating layer.

* * * * *